United States Patent Office 3,390,146
Patented June 25, 1968

3,390,146
PREPARATION OF AZO COMPOUNDS
Cyril H. Nield and James Clarke, Morristown, and Constantinos G. Screttas, Knoxville, Tenn., assignors to Chemetron Corporation, Chicago, Ill., a corporation of Delaware
No Drawing. Filed Apr. 7, 1964, Ser. No. 358,063
5 Claims. (Cl. 260—192)

This invention relates to a process for producing azo compounds and more particularly azo compounds corresponding to the formula (I) 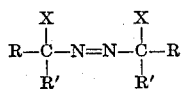

wherein R is a hydrocarbon radical including both aliphatic and cyclic as well as alkoxyhydrocarbon, R' is an alkyl group containing 1–6 carbon atoms with R and R' together in some instances forming a cyclic radical, and X is a nitrile, carboxylate or a carboxylic ester group.

The compounds of the above structure are useful as blowing agents for making sponge rubber through the evolution of nitrogen. These same compounds are also useful as polymerization catalysts as described in Hunt, U.S. Patent 2,471,959, patented May 31, 1949. Those compounds where X is a nitrile group, R' is methyl and R is an alkyl group are particularly useful for these purposes.

An economical preparation of azo compounds of the type concerned with in this invention has been the subject of investigation by various manufacturers. One of the common industrial methods of preparing the azo compounds employs hydrazine as a raw material. An example of such a preparation is described by Dox in J. Am. Chem. Soc., 47, 1471–1477, 1925. This material is relatively expensive and consequently was a major factor in the cost of the azo product. It was subsequently discovered that the use of hydrazine could be circumvented by employing a cyanohydrin intermediate and ammoniating it to form an alpha-aminonitrile as a further intermediate. The alpha-aminonitrile is subsequently oxidized with an alkali or alkaine earth metal hypohalite to form the desired azo end product. The previously described procedure is outlined in U.S. 2,711,405 wherein the patentee states that a condition of the oxidation step is that it must be carried out at a temperature below 10° C. A temperature restriction is also described in U.S. 2,713,576 wherein the temperature is at all times held at 15° C. or below. In addition to the temperature restrictions during the coupling of the nitrogen atoms to form the azo moiety, another limitation of the previously described prior art process is in the use of a cyanohydrin as an intermediate. The ammoniation of a cyanohydrin often results in the formation of ammonium hydroxide as well as the desired alpha-aminonitrile intermediate. Consequently the alpha-aminonitrile must be separated from the reaction mixture containing the ammonium hydroxide before oxidation with the alkali or alkaline earth hypohalite if a commercially acceptable process is to be effected.

It will thus be apparent that in following the prior art process outlined above a multi-step procedure is necessitated along with low temperature restrictions during the oxidation step in order to commercially produce the desired azo compounds.

It is therefore an object of this invention to provide an improved process for preparing azo compounds. It is also an object of this invention to provide a commercial process for preparing azo compounds which employs relatively inexpensive starting materials. It is a further object of the present invention to provide a commercial process for preparing polymerization azo catalysts which has a minimum number of steps during the synthesis and does not require the maintenance of low temperatures during the formation of the azo moiety.

The foregoing and other objects and advantages are accomplished in accordance with the following outlined synthesis which particularly illustrates the use of the nitrile derivative in the second oxidation step:

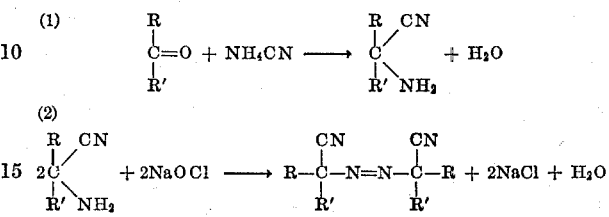

In the above described synthesis R and R' are previously described in general Formula I.

The nitriles are the preferred azo compounds. They are the most active polymerization catalysts and involve the least number of steps in synthesizing. However, to form the azo compounds wherein X is carboxylate or a carboxylic ester, the aminonitrile may be hydrolyzed in a conventional manner to the acid form prior to oxidation by the hypohalite. The acid can be further treated with lower aliphatic monohydric alcohols to produce the ester. During the oxidation of the aminonitrile with the alkali metal or alkaline earth metal hypohalite, the carboxylic group formed therefrom will be used in the salt form because of the free base present with the hypohalite in the reaction mixture. The salt will preferably be formed from the alkaline and alkaline earth metals.

In accordance with one embodiment of this invention, the desired azo nitrile can be formed from the herein described ketone and ammonium cyanide. The ammonium cyanide which is the source of the ammonium and cyano ion is first formed by reacting hydrogen cyanide with ammonia. It is preferred to use aqueous ammonia since the reaction is exothermic. Commercially available 28% aqueous solution of ammonia precooled to about 10° C. has been found to work well while maintaining the temperature of the reaction at about 10° C. Equimolar proportions of ammonia and hydrogen cyanide are preferred, however, a 10% molecular deficiency of ammonia can also be used. In either event, the hydrogen cyanide is added slowly to the ammonia solution. Upon formation of the ammonium cyanide, the desired ketone is slowly added thereto, and the temperature should be about 10° C. The ketone, like the ammonia and the hydrogen cyanide is employed in an equimolar amount. During the reaction of the ketone with the ammonium cyanide the corresponding alpha-aminonitrile is formed as well as water. With the nitrile thus formed in an aqueous solution the aminonitrile product is in an ideal state for oxidation by the hypohalite which advantageously is an aqueous solution as will be apparent in the following description.

An aqueous solution of a hypohalite is preferably employed at a concentration of about 0.25–0.50 mole per liter or about 1.5–4.0% concentration with optimum yields being obtained at the 1.95% level. An important aspect in carrying out the oxidation of the amino intermediate to form the azo —N=N— bondage above 15° C. lies in the maintenance of the pH in the range of 10–13 without the use of excess caustic. It has been discovered that once the pH level is fixed within this range, varying the concentration of the hypohalite between 0.27 and 0.40 mole per liter has little effect upon the yield. It must be pointed out, however, that best yields are afforded when a 70–110% molar excess of the hypohalite to the alpha-amino intermediate is employed.

The time of reaction between the hypohalite and the amino derivative is very short which is an added feature in making the present process commercially attractive. Only about three minutes or less is required for the oxidation to take place. Longer periods of time can of course be employed if desired.

The invention is disclosed in further detail by means of the following examples which are set forth for the purpose of illustrating the invention, but, in no way, are to be construed as limiting the invention in spirit or scope.

Example I illustrates the formation of alpha-aminoisobutyronitrile following the general procedure outlined above for producing the nitrile intermediate directly from a ketone without the formation of an undesired side reaction product.

EXAMPLE I

Aqueous ammonia in an amount of 117.6 g. (1.794 m.) containing 25.9% ammonia is placed in a 250 ml. flask equipped with a stirrer, thermometer, dropping funnel and dry ice condenser. The ammonia solution is cooled to 10° C. and 54 g. (2.0 m.) of liquid hydrogen cyanide is slowly added with stirring over a 8–10 minute period while maintaining the temperature at 8–10° C. Into the dropping funnel is placed 116 g. (2.0 m.) of acetone and the acetone is added to the aqueous ammonia solution in the flask in a slow stream while holding the reaction temperature between 8–10° C. About 20 minutes is required to complete the acetone addition. After all the acetone is added the cooling bath is removed. During the subsequent next hour the solution temperature rises gradually from 10° C. to 35° C. before falling back to room temperature. The reaction mixture is stirred overnight for a total of 19 hours. During this period the solution color turns from yellow-orange to deep red-brown. Approximately 286 g. of liquid assaying 51.5% w./w. alpha-aminoisobutyronitrile, confirmed by infrared and titration methods, results. The product yield based on the ammonia is 97.7%. The material is suitable for use directly in the preparing of azobisisobutyronitrile as illustrated in Examples II–V.

The ketones used as starting materials correspond to the formula (II)

wherein R is hydrocarbon and alkoxyhydrocarbon and R' is lower alkyl, and as described in Formula I, R and R' can form a cyclic radical. They are well known materials.

In accordance with the procedure outlined in Example I the described ketones can be converted to the corresponding nitrile. For example, alpha-amino-alpha-methyl-gamma-methylvaleronitrile can be prepared from 2-methyl-4-pentanone; alpha-aminocyclohexanecarbonitrile from cyclohexanone; alpha-amono-alpha-methyl-gamma-methyl-gamma-methoxyvaleronitrile from 2-methoxy-2-methyl-4-pentanone; alpha-amino - alpha - phenylpropionitrile from phenylmethyl ketone; alpha - amino - alpha-methylbutyronitrile from methylethyl ketone; alpha-amino-alpha-ethylbutyronitrile from diethyl ketone; alpha - amino-alpha - cyclopropylpropionitrile from methylcyclopropyl ketone; alpha - amino - alpha-cyclohexylpropionitrile from methylcyclohexyl ketone; alpha-amino-alpha-cycloheptyl-propionitrile from methylcycloheptyl ketone; alpha-amino-alpha-isopropyl-beta-methylbutyronitrile from di-isopropyl ketone; alpha - amino - alpha-gamma-dimethyl-capronitrile from 4 - methyl - 2 - hexanone; alpha-amino-alpha-n-butylcapronitrile from di-n-butyl ketone; alpha-amino-alpha-isobutyl-gamma-methylvaleronitrile from 2, 5-dimethyl - 4 - heptanone; and alpha-aminocycloheptane-carbonitrile from cycloheptanone.

As described previously in a general manner, the acids and esters of the azo compounds can in turn be formed from the corresponding nitriles. For instance, alpha-aminoisobutyric acid is produced by complete hydrolysis of the alpha-aminoisobutyronitrile. To form the methyl and ethyl esters of the alpha amino isobutyric acid, the acid is merely reacted with methanol and ethanol respectively in a well known manner. Other acids and lower alkyl esters containing 1–6 carbon atoms can be formed in a similar manner.

Examples II–V illustrate the conversion of the alpha-aminonitrile compound to the azo bondage.

EXAMPLE II

Into a one liter beaker is placed 465 cc. of an aqueous sodium hypochlorite solution containing 0.124 mole of the hypochlorite. The dilute solution has a temperature of 20° C. by virtue of it being at room temperature. The hypochlorite concentration is about 0.267 mole/liter and the solution has a pH of about 10.6. To the hypochlorite solution is added as rapidly as possible 11.6 g. (0.0711 m.) of the crude alpha-aminoisobutyronitrile prepared in Example I in 51.5% w./w. aqueous solution. This corresponds to a 74.4% molecular excess of the hypochlorite. The resulting solution is stirred vigorously for three minutes while holding the temperature at 20° C. by means of ice addition. A precipitate forms which is filtered on a Buchner filter, washed thoroughly with water and dried in air. The product, alpha,alpha' - azobisisobutyronitrile melts at 102–103° C. yielding 4.5 g. for a 77.2% yield.

The following example illustrates the hypochlorite oxidation of the nitrile without the use of any cooling.

EXAMPLE III

The procedure outlined in Example II is employed utilizing 500 ml. of an aqueous solution containing 0.1503 mole of sodium hypochlorite and 10 gm. of a 58% w./w. aqueous solution of the alpha - aminoisobutyronitrile (0.060 mole). This is a 120% molecular excess of the hypochlorite. A pH of 10.0 is maintained by means of addition of dilute HCl solution. The temperature of the reaction mixture is 20° C. at the start. The entire reaction is carried out in three minutes and at the end of the three minute period the temperature rises to 29° C. A yield of 3.9 grams of the desired alpha,alpha'-azobisisobutyronitrile is obtained giving a yield of 69.0%.

In the following Examples IV and V the alpha-aminoisobutyronitrile was formed from the well known reaction of acetone, sodium cyanide and ammonium sulfate rather than the procedure outlined in Example I. It is readily apparent that nitriles formed in accordance with the procedures of Example I can likewise be employed without isolation from the reaction products as is necessary when ammonium sulfate and sodium cyanide are used.

EXAMPLE IV

The same procedure outlined in Example II is followed employing 430 cc. of an aqueous sodium hypochlorite solution containing 0.1503 mole of the hypochlorite and 10 grams of the crude alpha - aminoisobutyronitrile (0.0739 mole) in the form of a 62% w./w. aqueous solution. A 103.6% molecular excess of the hypochlorite is thereby employed. The pH of the solution is 12.34 adjusted by addition of 70 ml. of 1% sodium hydroxide solution to the hypochlorite solution. A 20° C. temperature of the reaction mixture is maintained throughout the reaction which is conducted over a period of three minutes. The desired product, alpha-alpha'-azobisisobutyronitrile is recovered in a yield of 74.4% weighing 4.5 grams.

EXAMPLE V

The procedure outlined in Example II is followed except that the total volume of aqueous sodium hypochlorite solution is 5,000 cc. containing 1.503 mole of the hypochlorite and 100 gm. of a 62% w./w. aqueous solution of alpha - aminoisobutyronitrile (0.739 mole). This is a 103.6% molecular excess of the hypochlorite.

The reaction is carried out at a temperature of 35° C. for one minute. A yield of 59.4% of the alpha,alpha'-azobisisobutyronitrile is obtained weighing 36 grams and assaying 99.5%.

In accordance with the procedure described in Examples II–V other alpha-amino compounds, whether formed from ketones by the procedures previously described or by other means, can be directly oxidized to the corresponding azo compounds. For example, alpha-amino-alpha-methyl-gamma-methylvaleronitrile can be converted to alpha,alpha'-azobis (alpha,gamma-dimethylvaleronitrile); alpha-amino-methylisobutyrate to dimethyl alpha,alpha'-azodiisobutyrate; alpha-aminocyclohexanecarbonitrile to 1,1'azodicyclohexanecarbonitrile; alpha - amino - alpha - methyl-gamma-methyl-gamma-methoxyvaleronitrile to alpha,-alpha'-azobis (alpha, gamma - dimethyl-gamma-methoxy-valeronitrile); alpha-amino - alpha - phenylpropionitrile to alpha,alpha'-azobis (alpha-phenylpropionitrile); alpha-amino-alpha-methyl - butyronitrile to alpha,alpha'-azobis (alpha-methylbutyronitrile); alpha-amino-alpha - ethylbutyronitrile to alpha,alpha'-azobis (alpha-ethylbutyronitrile); alpha - amino-alpha-cyclopropylpropionitrile to alpha,alpha'-azobis (alpha-cyclopropylpropionitrile); alpha-amino-alpha - cyclohexylpropionitrile to alpha,alpha'-azobis (alpha - cyclohexylpropionitrile); alpha-amino-alpha - cycloheptylpropionitrile to alpha,alpha'-azobis (alpha-cycloheptylpropionitrile); alpha-amino-alpha-isopropyl-beta-methylbutyronitrile to alpha,alpha'-azobis (alpha-isopropyl-beta-methylbutyronitrile); alpha-amino-alpha,gamma-dimethylcapronitrile to alpha-alpha'-azobis (alpha,gamma-dimethylcapronitrile); alpha-amino-alpha-n-butylcapronitrile to alpha,alpha'-azobis (alpha-n-butylcapronitrile); alpha-amino-alpha-isobutyl-gamma-methylvaleronitrile to alpha,alpha'-azobis (alpha - isobutyl-gamma-methylvaleronitrile); alpha-aminocycloheptanecarbonitrile to 1,1'-azodicycloheptanecarbonitrile; alpha-aminoisobutyric acid to alpha,alpha'-azodiisobutyric acid; and ethyl alpha-aminoisobutyrate to diethyl alpha,alpha'-azodiisobutyrate.

Sodium hypochlorite is the preferred alkali hypohalite in carrying out the oxidation of the alpha-amino compounds at a temperature of 20° C. or above. Any alkali metal or alkaline earth metal hypohalite can be employed but the hypochlorites are preferred. Sodium, potassium, calcium as well as lithium, strontium and barium are representative of the alkali and alkaline earth hypohalites. It is readily apparent that the hypohalite can be formed if desired in the reaction vessel prior to the introduction of the alpha-amino compound by the interaction of an alkali or alkali metal hydroxide with the desired halite ion. In the instance of the present invention one can control the pH of the reaction mixture more easily during the oxidation of the alpha-amino derivative by means of the hydroxide but caution must be taken not to have a substantial excess of such hydroxide. As shown in Example II a hypochlorite concentration of 0.267 mole/liter has a pH of about 10.6. No excess caustic is employed whereas in Example IV a slight amount of sodium hydroxide is used to adjust the pH. As previously indicated, no excess caustic other than to adjust the pH within the prescribed limits of 10–13 should be used.

Hypohalites readily decompose when heavy metals such as iron and copper are present. The present synthesis is therefore best carried out in the absence of these metals by employing a metallic free reaction vessel as well as reagents and solvents free of heavy metals.

It will thus be seen that through the present invention there is provided a commercially feasible process for producing azo compounds involving a minimum number of steps and isolation procedures. The process employs relatively inexpensive starting materials and does not require low temperatures during the oxidation of the amino compounds when employing the procedures described herein.

Others may readily adapt the invention for use under various conditions of service by employing one or more of the novel features disclosed or equivalents thereof. All such which do not depart from the spirit of this disclosure are intended to be within its scope, which at present advised is best defined in the appended claims.

We claim:
1. In a process for preparing compounds of the formula

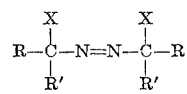

from a compound of the formula

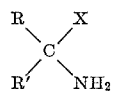

wherein R in the above formulae is selected from the group consisting of lower alkyl, cycloalkyl, phenyl and lower alkoxyalkyl, R' is lower alkyl or R and R' together forming cycloalkyl or phenyl and X is selected from the group consisting of nitrile, alkali and alkaline earth lower alkyl carboxylate and a lower alkyl carboxylic ester group, by oxidation of said compound with an aqueous alkali metal or alkaline earth metal hypohalite solution to form the desired end azo product, the improvement comprising conducting said oxidation at a temperature of at least about 20° C. while maintaining the pH of the reaction mixture between about 10–13.

2. The process as defined in claim 1 wherein R and R' are lower alkyl and X is nitrile.

3. The process as defined in claim 2 wherein an alkali metal hypohalite is employed at a molar concentration in the range of between about .27–.40 mole per liter during the oxidation step.

4. The process as defined in claim 3 wherein the amino compound is alpha-aminoisobutyronitrile and the oxidation thereof is effected by about 70% molar excess of sodium hypochlorite.

5. A process for preparing alpha,alpha'-azobisisobutyronitrile which comprises reacting alpha-aminoisobutyronitrile with an alkali metal hypochlorite in an aqueous solution wherein the hypochlorite is employed at a concentration not exceeding 4% by weight based on the reaction mixture, the temperature of said solution is at least 20° C. and the pH thereof is in the range of between about 10–13 and separating the product from said reaction mixture.

References Cited

UNITED STATES PATENTS 2,713,576  7/1955  De Benneville _____ 260—192
3,207,714  9/1965  De Benneville et al. _ 260—192 X

FOREIGN PATENTS 1,240,634  8/1960  France.

CHARLES B. PARKER, *Primary Examiner.*

D. M. PAPUGA, *Assistant Examiner.*